United States Patent Office 3,782,921
Patented Jan. 1, 1974

3,782,921
PRODUCTION OF STEEL WITH A CONTROLLED PHOSPHORUS CONTENT
Ernest Glaesener, Francois Schleimer, Fernand Wagner, Ferdinand Goedert, Alex Bauer, and Robert Mousel, Dudelange, Luxembourg, assignors to Arbed Acieries Reunies de Burbach-Eich-Dudelange, Luxembourg
No Drawing. Filed May 18, 1972, Ser. No. 254,680
Claims priority, application Luxembourg, May 21, 1971, 63,209
Int. Cl. C21c 7/02
U.S. Cl. 75—51    18 Claims

ABSTRACT OF THE DISCLOSURE

To prevent rephosphorizing reaction during tapping of the refining furnace into a metallurgical vessel, any premature decrease in the activity of the oxygen in the steel and in the slag entrained with the steel (which the addition of deoxidizing or alloying agents would bring about) is avoided while the steel in the vessel is still intimately mixed with the slag which is inevitably entrained. No deoxidizing and alloying agents are added until the slag has thickened on the surface of the steel in the vessel. A depyhosphorizing process can be carried out in the vessel.

---

The present invention concerns methods for the production of steel with a controlled phosphorus content. In this specification, percent refers to percent by weight.

The fact that it is possible to refine low-phosphorus hermetite pig-iron to produce rimming steels with a very low phosphorus content (approximately 0.010% and even less) is attributable solely to the absence of rephosphorization in the ladle, this being made possible by virtue of sufficiently low $P_2O_5$ contents in the converter and ladle slags. On the other hand, for killed steels, the $P_2O_5$ content of the slags even of the refining slag of a hematite pig iron which is low in phosphorus, is too high for rephosphorization in the ladle to be avoided. This is even more the case for steels worked from a phosphorus pig iron, both for the killed grades and for the rimming grades.

Futhermore, steelmakers have always directed their research towards clearly separating the steel and the refining slag, whose $P_2O_5$ content can fluctuate between 2% and 25% according to the nature of the pig iron or the method of refining used. Attempts have therefore been made to solve the problem by making use of the solution which seemed to be the most economical and logical one, i.e. the effective retention of the phosphorus slag in the refining furnace. Over the years various techniques have been tried, such as the installation of various dams or barriers in the mouth of the furnace, internal or external means for obturating the tapping hole, or the thickening of the refining slag by various treatments. None of these techniques however has made it possible to solve the problem entirely satisfactory because there is always a certain amount of slag which is carried into the ladle and can there give rise to rephosphorization.

As it was found to be impossible to avoid dephosphorization by these devices, an attempt was made to solve the problem by using dephosphorizing mixtures. This treatment is normally carried out in the ladle and consists in creating intimate contact between the refined steel and a slag mixture containing various basic nad oxidizing constituents as well as possibly fluidizers, these constituents usually being lime, limestone, iron oxides in the form of ores, iron scale or products of the dust recovery, fluorspar, borax, and soda.

These slag mixtures, generally in the form of powder, are introduced into the ladle, before the tapping of the refining furnace, or are poured into the jet of tapped metal so as to be carried with the steel into the ladle, or are blown directly into the steel in the ladle. It has however been found that the dephosphorizing reaction does not always take place to the extent required, and that the phosphorus contents of the finished product vary considerably from one charge to another. If the phosphorus contents are relatively high before treatment, that is to say more than 0.025%, there is certainly some dephosphorization. If on the other hand the initial phosphorus content of the steel is already sufficiently small, these additions, even if massive ones, in general serve at the most to counterbalance the effect of rephosphorization in the ladle.

In another method known in the literature as the Perrin method, the steel is intimately mixed with a synthetic, basic, oxidizing slag that is in a molten state and very fluid, by pouring the two jets simultaneously into a ladle. Before the treatment the dephosphorizing slag must be melted separately in a furnace and be kept at a temperature approximating that of the steel to be treated. The technical difficulties attendant on putting this method into effect, the practical disadvantages, and the fact that the method is found to be economic only in certain exceptional cases, means that the method does not have the wide applicability and advantages that were expected from it; it has not become widely accepted for the treatment of Thomas steel.

In contrast to the conventional methods described above, which allow only a counterbalancing of the rephosphorization by a reaction in the opposite direction namely dephosphorization by the introduction of dephosphorizing additives in the ladle, the present invention aims to producing an operational technique by which it is possible to avoid rephosphorization in the ladle without the necessity of any rephosphorizing, whatever may be the refining the steel, the type of process to be produced, whether rimming or killed, the initial phosphorus content of the steel in the refining furnace, or the quantity and $P_2O_5$ content of the slag entrained during tapping of the furnace.

In adidtion to fulfilling this condition, which is an essential one for the effective control of the phosphorus content of steels in the course of treatment, the invention aims to make it possible to produce steels with a very low phosphorus content by dephosphorization of the order of 40% to 70% effected in a metallurgical vessel, such as a teeming ladle, by means of a slag mixture having basic and oxidizing constituents, acting on steels which already have a fairly low initial phosphorus content (approximately 0.015% to 0.02%), the de-phosphorization taking place also without intermediate re-phosphorization, whatever the grade of steel to be produced.

The present invention provides a method for the production of steel with a controlled phosphorus content, in which to prevent rephosphorizing reactions during the tapping of the steel from the refining furnace into a metallurgical vessel, any premature decrease in the activity of the oxygen in the metal and in the slag entrained with the metal (which the addition of deoxidation and alloying agents would bring about) is avoided while the metal in the vessel is still intimately mixed with the slag which is inevitably entrained and no deoxidizing and alloying agents are added until the slag has thickened on the surface of the steel in the vessel.

It is usually necessary to leave the steel at rest for approximately 1 to 2 minutes to allow the slag to become sufficiently thick before effecting the addition deoxidizing and alloying agents to the steel.

It is in fact found that rephosphorization of the steel, which is feared so much, is not attributable to the presence of phosphorus slags but essentially to the fact that as a result of the addition of deoxidizers or alloy elements the activity of the oxygen both in the steel and in the slag decreases greatly and thus creates an environment favourable to the absorption of phosphorus by the steel. In current practice these deoxidizing and alloying additions are always introduced into the steel either before or during the tapping of the refining furnace in order thus to obtain perfect homogenisation. Consequently, the exchange reactions between the steel and the entrained slag can develop without any hindrance. Also, the addition of dephopshorizating slags has the secondary effect of decreasing the activity of the $P_2O_5$ by dilution of the slag which has unavoidably been entrained, thereby compensating its noxious effect.

From the description of the present invention it will be clear that the solution of the problem does not reside purely and simply in preventing any entrainment of phosphorus slags (which, as we have stated, is impossible in current practice or in the diminution of the activity of the $P_2O_5$, but resides above all in preventing for the requisite period of time before and during tapping and in the ladle) any lowering of the activity of the oxygen in the steel and in the slag in relation to that which existed in the refining furnace.

The invention offers the further advantage that, as the activity of the oxygen is not decreased by the addition of the deoxidizing and alloying agents during tapping into the ladle, the steel is found to be under particularly favourable conditions for being subjected to a dephosphorizing treatment by means of suitable slags even in the case of very low phosphorus contents at the end of the refining operation.

Accordingly, to achieve the desired results, that is to say to prevent rephosphorization and, if need be, to cause dephosphorization to the desired extent, even with steels having an initially low phosphorus content (order of 0.015% to 0.02%), there are two conditions to be respected: the first is that, during tapping and when the steel is initially in the ladle, the oxygen activity should be sufficiently high to counteract any tendency for the steel to absorb phosphorus from the slag entrained with the steel; the second condition (particularly when one adds a dephosphorizing agent in powder form either during tapping or directly afterwards) is that the steel should be allowed to stand for a time that is adequate to permit reactions at the interface of the slag with the metal to terminate. It is only when this second condition has been fulfilled that one will be able to proceed to add to the steel additives liable to reduce the activity of the oxygen in the steel, that is to say alloys and deoxidizers. It is only in this way that one can avoid the contrary effects of deoxidizing and dephosphorizing additives from partially cancelling each other out uncontrollably to the detriment of the final phosphorus analysis.

Conveniently, the refining furnace for the steel, which will in general be a converter, is tapped at the end of the refining operation into a metallurgical vessel, most frequently a teeming ladle, without a special measures for retaining the refining slag; the phosphorus content of the steel may be between 0.015% and 0.02%. As it is important at this stage to keep an oxygen activity that is sufficiently high, no additive is added to the bath which would be liable to lower this activity and bringing about rephosphorization by the entrained phosphorus slag, which in the case of the Thomas method may titrate up to 22% by $P_2O_5$. The dioxidizers and alloys will be introduced into the vessel only after it has been filled and the slag floating on the top has thickened slightly which occurs one to two minutes after tapping. If this operational technique is followed there is no rephosphorization of the steel (contrary to what always occurs in conventional practice) in spite of the presence of a greater quantity of phosphorus slag.

The invention is also applicable to the manufacture of steels with a very low phosphorus content, lower than 0.010%, without necessitating very low phosphorus contents in the refining furnace, which, in the refining of high-phosphorous pig iron, always involves technical difficulties and high losses. In this case a dephosphorizing slag mixture containing lime, iron oxide and, if required, a fluidizer, is poured into the teeming ladle at the beginning of tapping, preferably in the form of powder. This mixture can also be projected against the tapping jet at the outlet of the converter so as to be entrained deeply into the metal in the ladle, or blown deeply into the metal by means of a plunging lance. The quantity of slag required is about 6 kg. or 12 kg. per metric ton of steel for dephosphorization by about 40% to 70% of a steel whose initial phosphorus content is 0.015% to 0.02%. Thus a special furnace for the pre-treatment of the slag is not required as is the case for carrying out the Perrin method.

To increase the surface area of the steel in contact with the dephosphorizing slag, and thus to accelerate the reaction, one can agitate the steel, for instance by blowing in a gas, such as nitrogen or argon, through porous brick arranged in the bottom or wall of the teeming ladle or through the stopper rod or by means of a plunging lance.

It is possible to obtain effective mixing economically by the evolution of gas from wooden rods or shafts fixed on the internal periphery of the metallurgical vessel. The bubbling and mixing can easily be regulated by appropriate choice of the cross-sectional area of the rods or shafts.

The combustion of the shafts of wood produces carbon monoxide at the slag-metal interface which causes bubbling of the bath during the tapping of the refined steel and thus guarantee the renewal of the contact surface of the steel with the dephosphorizing agent added before or during tapping.

Agitation or mixing of the steel can also be induced by means of the release of carbon monoxide from some carbon placed in the metallurgical vessel before tapping or as tapping is begun. Preferably, most of the carbon is added at the bottom of the vessel before the beginning of tapping.

When the ladle is full, it is generally withdrawn from beneath the refining furnace so as not to restrict the normal operation of the furnace. In the meantime the interface reactions between the metal and the slag will be practically terminated and the slag will be partly thickened and will have lost some of its reactiveness. It is not until this moment that the necessary additions of FeMn, FeSi, Al, C, and so on, are made.

The low density additions (aluminum, carbon) are preferably blown into the steel in the ladle by means of a plunging lance. This avoids losses of light elements to the slag while limiting any injurious effect they may have on the activity of the oxygen in the slag, and improves the effectiveness of the additives since they are injected directly into the bath.

After the slag has thickened sufficiently, one can delimit a given volume of steel in the ladle and a given area of the upper surface of the steel, free of slag by introducing into the steel through the slag a conduit whose lower end is obturated by a wall which is destructible on contact with the molten steel, so that the conduit displaces the slag. The conduit is inserted in such a manner that its upper end remains above the level of the slag and its lower end is definitely immersed in the steel. Most or preferably all of at least those additives which have lower density than the slag, or can react with it, are fed into the steel through the conduit. Simultaneously, intense circulation of the steel is produced by blowing in a gas near the bottom of the ladle, dispersing through the entire mass the steel initially enriched with additives.

In this manner it is almost impossible for there to be any uncontrolled rephosphorization as the slag no longer comes into direct contact with agents tending to decrease its oxygen activity and to reduce the $P_2O_5$; the internal volume of the conduit in the bath actually defines a fairly large zone which is free from slag where reactions take place between the steel and the additives poured onto the surface of this zone. The mass enriched with additives, which forms in this zone, is driven continuously towards the bottom of the vessel and disperses through the entire volume of steel. To obtain a truly homogeneous bath it is important for the blowing in of an inert gas, for instance nitrogen, to begin as soon as the additives are fed in, and to occur near the bottom of the ladle; the blowing should be sufficiently forceful for the entire mass of steel to be affected by the circulation caused. After all the additives have ben poured into the interior of the conduit, the bubbling of gas is continued for instance for one to three minutes.

The dimensions of the conduit are adapted to those of the metallurgical vessel containing the steel to be treated; it can for instance be of a metallic material covered with refractory material. Advantageously use is made of a conduit of substantially cylindrical shape obturated for passing through the slag by a bottom member, for instance a plate, of conical shape.

The introduction of the conduit into the steel in the ladle automatically produces a surface area free from slag and simultaneously delimits the zone of the steel into which the additives are to be fed. The additives are poured into the conduit where they meet the steel once the base member of the conduit has melted and the blowing lance has been introduced through the conduit into the steel and has been supplied with gas. The lower end of the conduit opens out into the bottom half of the bath. By virtue of the depth of penetration of the conduit, which is quite considerable, the contact between the steel and the additives and the dissolution of the additives in the zone defined by the conduit are enhanced by the gas rising up in the bath and passing at least in part through the conduit. In the same way additives which are not dissolved or only partly dissolved cannot rise again to the outside of the wall of the conduit and so cannot come into contact with the slag confined on the periphery of the conduit. Finally, the mass of steel enriched with additives is delivered deep down in the ladle and, with the assistance of intense circulation, quickly distributes itself uniformly throughout the entire mass of steel.

The activity of the oxygen of the steel in the ladle can advantageously be increased not by incorporating an oxidizing constituent with the dephosphorising powder but by blowing an oxiding gas, preferably oxygen, against the tapping jet or into the steel in the ladle during tapping. In this case the dephosphorizing powder added will contain as its main constituent only a basic agent with which may be mixed a certain percentage of a fluidizer. Blowing oxidizing constituent with the dephosphorising powder but is advantageous for the exchange reactions between the slag and the steel.

It is thus easy to obtain phosphorus contents in the final product betwen 0.007% and 0.009%, the analysis deviations from the first to the last ingot cast scarcely exceeding 0.001% P. These results show that, if one allows equilibrium to be set up between the steel and the slag floating on the steel in favourable conditions before decreasing the oxygen potential of the bath, the risks of a subsequent alteration in the analysis become practically negligible.

For the dephosphorizing process, use can advantageously be made of an intermediate vessel of the mixer type having a capacity such that one can accumulate in it a tonnage which is much greater than the weight of a single heat. An intermediate reserve of finely refined steel is placed in the mixer, which is heated. The mixer is arranged on a transport truck so as to be tiltable for easy deslagging. The dephosphorisation operations are carried out in the way described above.

Such an arrangement makes it possible to bring great flexibility to the manufacturing programme, in particular if one is concerned with converter vessels of very large tonnage, even several hundred metric tons. According to requirements for a given quality of steel, the weight of metal required will be withdrawn from the mixer, usually through the bottom; the weight withdrawn can be less or greater than that of a heat, according to the volume of the vessel. Whatever may be the tonnage and quality of steel required, whether it is mild steel, rimming or killed, or hard steel, the required additives will be made in the teeming ladle after tapping the mixer, without the slightest risk of re-phosphorisation. This arrangement makes it possible to have continuous operation in the sense that an adequate reserve of initial steel of the same composition is always available.

Example 1

In an LDAC steelworks the analysis of the top sample taken in the converter at the end of the blow was as follows: C 0.045%, Mn 0.055%, P 0.013%, S 0.018%. The charge amounting to 72 metric tons was tapped into the ladle without particular measures being taken to avoid entrainment of refining slag (titrating at about 8% $P_2O_5$). The steel was subjected to treatment with any de-phosphorizing additive. When the ladle was full and the slag floating on the top had thickened slightly, 350 kg. of ferro-manganese (titrating 75% Mn and 0.2% P) were introduced into the ladle. Slight bubbling of the bath was provoked by plunging a shaft of wood of section 30 mm$^2$ into it.

No appreciable rephosphorization took place at all, either before or during the casting of ingots, in spite of the presence of a quantity of phosphorous slag with 8% $P_2O_5$ which should have been adequate in current practice to cause the phosphorus content of the steel to increase by several thousandths. The final analysis was as follows: C 0.075%, Mn 0.32%, P 0.014%, S 0.018%. The increase in phosphorus, which for 75 charges remained constant at 0.001% for all the ingots, is attributable exclusively to the phosphorus in the ferro-manganese.

Example 2

In an LDAC steelworks the analysis of the tap sample taken in the converter at the end of the blow was follows: C 0.050%, Mn 0.070%, S 0.015%, P 0.015%. The temperature of the steel at the end of the conversion operation was 1605° C. At the beginning of the tapping of 70 metric tons of steel through the tap-hole into the receiving ladle, dephosphorizing powder was added, composed of 450 kg. of lime, 250 kg. of ores (titrating 65% Fe) and 20 kg. of fluorspar. At the same time bubbling of the bath was caused by combustion as tapping proceeded, of four shafts of wood fixed to the periphery of the ladle. The time taken for tapping and for the simultaneous dephosphorizing process, for the 70 metric tons of steel, was two minutes. After this treatment, the analysis of the metal was as follows: C 0.035%, Mn 0.060%, S 0.014%, P 0.008%. The temperature was 1580° C.

The ladle was withdrawn from under the converter and was taken to the casting pit. The reaction at the steel-slag interface having in the meantime abated, an addition of 350 kg. of ferro-manganese (75% Mn) was made, and bubbling was induced by plunging a shaft of wood into the bath. The phosphorus content of the teeming jet did not vary and remained at 0.008% for the entire casting operation. The maximum deviation in the finished ingots for about 30 charges was 0.008±0.001% P.

The same result was obtained if one omitted from the dephosphorizing mixture the all or part of the iron ore and if one treated jet issuing from the tap-hole at the furnace, or the steel in the ladle, with a corresponding quantity of oxygen.

Example 3

In a Thomas steelworks a charge was produced with a double sodic slag. The final P content of the charge rose to 0.016%. After dephosphorizing treatment in the ladle by blowing a basic oxidizing mixture with air through a plunging lance, the phosphorus content of the steel dropped to 0.009%.

It is a well known fact that, in present steelmaking practice, the risk and extent of dephosphorization taking place are higher the higher the alloying element content of the steel bath. In the methods described above, this risk is non-existent, and it is furthermore possible to realize dephosphorization of the steel which is to be subjected to alloying treatment, as shown by Examples 4 and 5 below.

Example 4

For the production of a carbon steel of C 0.45% grade, an initial steel was used the analysis of which on the tap sample gave C 0.100%, Mn 0.080%, P. 0.018%, S 0.014%. 70 metric tons of this steel refined in an LD-AC converter weer tapped into the ladle without special measures being taken to prevent slag entrainment. The ladle was taken to the casting pit, where additions were made successively of 650 kg. of FeMn (75% Mn, 0.2% P), 250 kg. of carbon as powder blown in by a plunging lance, and 270 kg. of solid FeSi. The analysis of the ingot was as follows: C 0.44%, Mn 0.70%, Si 0.25% S 0.15% and P 0.020%; it was constant from the first to the last ingot. The increase of phosphorus of 0.002% is attributable to its presence in the ferro-alloys.

Example 5

For the production of an aluminum-killed steel with low phosphorus content, below 0.020%, use was made of a steel whose initial analysis was: C 0.060%, Mn 0.070%, S 0.016%, P 0.015%. After the dephosphorizing treatment carried out as indicated above, the analysis was as follows: C 0.045%, Mn 0.055%, P 0.010%. Following the dephosphorizing treatment and without intermediate deslagging, but of course after allowing the bath to come to rest, aluminum was blown into the steel by means of a plunging lance. FeMn was then added in lumps. The analysis of the ingots was as follows: C 0.080%, Mn 0.450%, P 0.010%, Al 0.06%, S 0.015%.

Example 6

An aluminium killed-steel with low phosphorus content was produced by tapping, into a steelworks ladle of diameter 2600 mm. and height 2500 mm., 72 metric tons of steel obtained by refining a phosphorus pig iron; the steel in the ladle was covered with approximately 2 metric tons of dephosphorizing slag.

After the thickening of the slag, a cylindrical conduit of diameter 1100 mm. and height 1800 mm. was plunged into the steel through the slag layer, the bottom of the conduit being obturated by a conical cap of sheet steel; the depth of penetration in the steel was 150 mm. The sheet obturating the bottom of the conduit melted as it was immersed in the steel. A lance with an orifice of 6 mm. was then plunged through the conduit to about 10 cm. from the bottom of the ladle. Nitrogen under pressure of 4–5 kg./cm.² was blown into the steel and brought about energetic bubbling.

Onto the metallic surface free from slag in the conduit were successively poured approximately 70 kg. Al granules, 470 kg. solid manganese, 65 kg. Al granules, 15 kg. graphite, and finally 470 kg. solid ferro-manganese. The agitation to achieve homogenization and also the purification of the steel was continued for a further 3 minutes.

Steel was obtained whose ingot analysis was as follows: Co 1.14%, Mn 0.88%, P 0.007%, Al 0.06%, S 0.015%.

We claim:

1. A method for the production of steel with a controlled phosphorus content, comprising the sequential steps of (a) preparing a charge of refined steel in a refining furnace with the aid of a refining slag; (b) tapping the refined steel from the furnace into a metallurgical vessel, some of the refining slag being inevitably entrained with the steel; (c) allowing the steel to stand in the vessel for 1 to 2 minutes after the conclusion of tapping, so that the slag, which is inevitably entrained with the steel, forms a layer on the surface of the steel; and (d) adding at least one substance selected from the group consisting of deoxidizing agents and alloying agents to the steel only after step (c), thereby preventing any premature decrease in the activity of the oxygen in the steel and in the slag which would otherwise cause rephosphorization of the steel.

2. A method as claimed in claim 1, including carrying out a de-phosphorizing treatment in the vessel by intimately mixing a basic oxidizing slag with the steel, and then leaving the steel for a time sufficient to permit interface reactions between the slag and the steel to terminate.

3. A method as claimed in claim 2, wherein the de-phosphorizing process further comprises blowing an oxidizing gas against the jet of tapped steel.

4. A method is claimed in claim 2, wherein the dephosphorizing process further comprises blowing an oxidizing gas into the steel in the vessel.

5. A method as claimed in claim 1, further comprising agitating the steel in the vessel by means of a gas.

6. A method as claimed in claim 2, further comprising agitating the steel in the vessel by means of a gas.

7. A method as claimed in claim 5, wherein the gas is blown in through a porous element.

8. A method as claimed in claim 5, wherein the gas is obtained by the combustion of at least one shaft of wood immersed in the steel.

9. A method as claimed in claim 5, wherein the gas is obtained by the combustion of carbon introduced into the vessel.

10. A method as claimed in claim 5, wherein the agitation is effected after the addition of said at least one substance.

11. A method as claimed in claim 1, further comprising blowing low denstiy additives into the steel through a plunging lance.

12. A method as claimed in claim 1, further comprising after the slag has formed a layer, delimiting an area of the upper surface of the steel in the vessel by introducing into the steel through the slag a conduit whose lower end is obturated by a wall that is destructible on contact with the steel, so that the slag is displaced by the conduit; introducing said at least one substance into the steel through the conduit; and blowing a gas in near the bottom of the ladle simultaneously with the introduction of said substance, to cause thorough circulation of the molten steel.

13. A method as claimed in claim 12, wherein the conduit is substantially cylindrical and its lower end is obturated by a conical plate.

14. A method as claimed in claim 12, including immersing the conduit so that it extends into the lower half of the steel in the vessel.

15. A method as claimed in claim 12, wherein the gas is inert.

16. A method as claimed in claim 1, further comprising pouring the steel from the vessel into a second vessel before the addition of said at least one substance.

17. A method as claimed in claim 16, wherein the first vessel is an intermedatie mixer tiltably mounted on a transport carriage.

18. A method as claimed in claim 17, including heating the mixer.

References Cited
UNITED STATES PATENTS

| | | | |
|---|---|---|---|
| 3,423,202 | 1/1969 | Ledune | 75—52 |
| 3,258,328 | 6/1966 | Goss | 75—57 |
| 3,169,058 | 2/1965 | Nelson | 75—59 |
| 3,151,976 | 10/1964 | Glaesener | 75—60 |
| 3,423,202 | 1/1969 | Ledune | 75—60 |

DEWAYNE RUTLEDGE, Primary Examiner

P. D. ROSENBERG, Assistant Examiner

U.S. Cl. X.R.

75—53, 58